G. Hastings.
Watch-Hand Die,

N° 54,898. Patented May 22, 1866.

Witnesses:
Samuel N. Piper
J. Curtis

Inventor:
George Hastings.
by his attorney,
R. H. Eddy.

UNITED STATES PATENT OFFICE.

GEO. HASTINGS, OF WALTHAM, MASSACHUSETTS.

IMPROVED DIE FOR SWAGING HANDS FOR WATCHES.

Specification forming part of Letters Patent No. 54,898, dated May 22, 1866.

*To all whom it may concern:*

Be it known that I, GEORGE HASTINGS, of Waltham, in the county of Middlesex and State of Massachusetts, have invented a new and useful Improvement in Dies or Mechanism for Making Watch or Time-Piece Hands; and I do hereby declare the same to be fully described in the following specification and represented in the accompanying drawings, of which—

Figure 1 is a top view of the lower die-block. Fig. 2 is an under-side view of the upper one. Fig. 3 is a vertical section of the two.

The object of these die-blocks is to make a watch-hand not only with the finger and its annulus, but with a cup or tube projecting from such annulus.

In the ordinary way heretofore practiced of making a watch-hand the holding or spindle tube thereof has been formed by soldering to the ring or circular part of the hand a cylinder of brass, and subsequently turning down and boring such cylinder until converted into a tube of the right size. Besides the labor and expense attendant on so making the tube of the hand, such tube is liable to become detached from the part to which it may be affixed, for there is more or less difficulty in properly uniting the tube to its ring by the soldering process.

The watch-hand made by my improved mechanism has its spindle-tube formed in one piece with the ring and the finger, and consequently the union of the ring and the tube will be perfect, and there is no danger of the two becoming detached from one another either in the process of fitting them to a watch-spindle or in that of making the tube.

In carrying out my invention I combine with those parts of the die by which the finger and the ring are struck or formed in one piece of metal a certain addition or further dies for forming an extension from the ring, such extension being either in the form of a cup or tube or a projection capable of being converted into a tube. I prefer to make the projection in the form of a cup, and subsequently to remove the bottom thereof so as to convert the cup into a tube.

There may be combined with the dies for making the cup a punch and a discharging-passage, such punch being to remove from the cup the bottom thereof, the part so removed passing down through the passage.

In the drawings, $a$ and $b$ are those parts of the die-blocks A B which serve to give form to the finger of the watch-hand. $c$, $d$, and $e$ are the parts by which the flat ring from which the finger projects is formed.

Above the part $c$ for making the ring is a depression or chamber, $f$, of a suitable diameter and depth for the formation of the tube-projection, such depression being made in the die-block A. The part $c'$, which forms the eye of the ring, may be projected beyond the dotted lines so as to enter the chamber $f$ (when the blocks are in contact) in order to form a cavity in the tube-projection or convert it into a cup.

Figure 2:
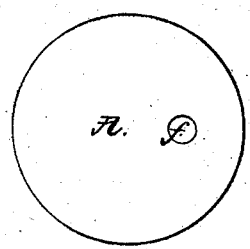
Figure 1:
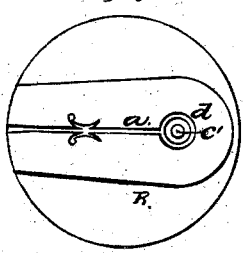
Figure 4:
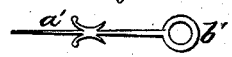
Fig. 4 is a top view, and Fig. 5 a longitudinal section, of one of the hands as made by such dies. In these figures, $a'$ is the finger, $b'$ the ring, and $c'$ the tube-projection.
Figure 5:
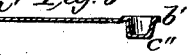
Figure 3:
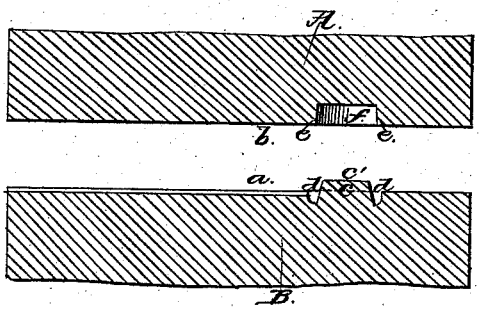
Figure 6:
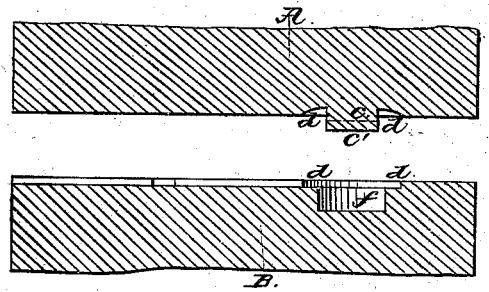
Fig. 6 is a vertical section of two die-blocks, showing another mode in which I have contemplated the application of my invention. In this figure the ring-making part of the dies is shown as partly formed in each block.

The eye punch or former $c$ or $c\ c'$ may be dispensed with when it may be desirable to form the hand without an eye and subsequently to make the eye by separate means. So, in case it may be desirable to make the projection with the eye to extend entirely through it, the part $c\ c'$ may be extended or constructed so as to accomplish this and to force the surplus metal removed into a passage formed through the other die-block. I do not, however, consider this so good a plan of procedure as to form the tube-projection either with or without a cavity, and afterward and by other means to complete the tube or impart to such projection a tubular form.

I would observe that the improved die-blocks constructed as above described are in general to be employed for forming in a piece of metal the watch-hand, the separation of the hand from the superfluous metal of the piece and the finishing of the hand being effected by other dies or suitable means.

I claim as my invention—

1. The combination and arrangement of the tube-projection-forming chamber $f$ with the finger and ring forming parts $a\ b\ d$, made as described.

2. The combination and arrangement of the eye-former $c$ or $c\ c'$, the tube-projection-forming chamber $f$, the ring-former $d$, and the finger-dies $a\ b$, the whole being substantially as and for the purpose specified.

GEO. HASTINGS.

Witnesses:
R. H. EDDY,
G. H. WASHBURN.